United States Patent Office

3,532,673
Patented Oct. 6, 1970

3,532,673
IMIDAZOPYRROLONE/IMIDE COPOLYMERS
Vernon L. Bell, Jr., and George F. Pezdirtz, Newport News, Va., assignors to the United States of America as represented by the Administrator of the National Aeronautics and Space Administration
No Drawing. Filed May 17, 1967, Ser. No. 640,454
Int. Cl. C08g 20/100
U.S. Cl. 260—78
7 Claims

ABSTRACT OF THE DISCLOSURE

This invention relates to novel copolymer compositions, composed of imide and imidazopyrrolone groups as integral units in the polymer chains, which have unusual levels of stability to strong acids and bases.

---

This invention relates to novel copolymer compositions having imide and imidazopyrrolone groups as integral units of the polymer chains, said polymers possessing improved levels of stability to strong acids and bases and useful in the fabrication of shaped articles, films, coatings, fibers and adhesives.

The invention relates to novel copolymers and the synthesis thereof and relates in particular to novel copolymers, composed of imide and imidazopyrrolone groups as integral units of the polymer chains, which have unusual levels of stability to strong acids and bases.

Linear polymers of polyimides, polyesters, polyimidazopyrrolones and the like are finding more and more applications in the plastics industry in the form of films, fibers and molded articles. Similarly, there appears to be an ever-increasing need in the aerospace and other industries for polymeric materials which have a high order of stability to elevated temperatures and ionizing radiation as well as being more resistant to solvolytic, oxidative, or degradative effects of strong acids and bases.

Accordingly, it is an object of the present invention to produce new and novel polymeric materials.

Another object of the present invention is the production of novel self-supporting flexible polymer films having high degrees of stability to strong acid and bases.

Another object of the present invention is the production of novel copolymers synthesized from the reaction of dianhydrides and amine solutions.

A further object of the present invention is a novel soluble intermediate stage imidazopyrrolone/imide copolymer from which films, fibers, and molded articles may be fabricated.

Further objects reside in the novel compositions and the processes by which the novel copolymers disclosed herein are produced.

Other objects and many of the attendant advantages of the present invention will be more apparent from the following detailed description and examples appearing hereinafter.

The polyimide class of polymers are known to possess outstanding physical properties, notably a high degree of stability to heat as well as excellent mechanical properties of shaped articles which are fabricated from the polymers, such as films, fibers, laminates, moldings and the like. However, although the polyimides possess excellent resistance to most organic chemicals and solvents, they are susceptible to degradative action by certain very strong acids and alkaline agents. For example, the fact that the solution viscosities of polyimides can be measured in fuming nitric acid denotes the lack of chemical resistance of the polyimides to that particular reagent. It is apparent that the utility of shaped articles which have been fabricated from the polyimides are of necessity limited to application only in environments which do not dissolve or degrade the polymer itself. For example, polyimides could not be successfully employed as coatings or valve seats for tanks containing strong acids or bases. It is therefore desirable to modify the chemical compositions of the polyimides in such a way as to make them more resistant to solvolytic, oxidative, or degrative effects of strong acids and bases if such modification can be achieved without attendant loss of the desirable properties of the polyimides.

The class of polymers known as the polyimidazopyrrolones, which are known to have high resistance to thermal and radiative energy as well as excellent mechanical properties of shaped articles derived from the polymers, display outstanding resistance to organic chemicals. In addition, the polyimidazopyrrolones, unlike the polyimides, show a remarkable resistance to the action of strong acids and bases. A more complete discussion of other properties of the polyimidazopyrrolones may be found in co-inventor Bell's copending patent application Ser. No. 510,155 filed Nov. 23, 1965.

Whereas the polyimide compositions are obtained by the reaction of dianhydrides with suitable diamines, followed by a curing of the resulting carboxy-substituted polyamides to the desired polyimide form, the polyimidazopyrrolones are synthesized by the reaction of dianhydrides with aromatic tetraamines (with each of two pairs of amino groups existing in an ortho-configuration), with a subsequent curing of the resulting carboxy- and amino-substituted polyamides to the desired polyimidazopyrrolone form. According to the present invention, it has been found that copolymers, the polymeric chains of which contain both imide and imidazopyrrolone groups, display markedly improved degrees of resistance to attack by strong acids and bases compared to the polyimides. This improvement in chemical stability is achieved by the inclusion of as little as ten percent of the imidazopyrrolone groups, and the improvement increases as the relative proportion of imidazopyrrolone units increases up to 75% or more. Furthermore, this improvement in chemical stability is accomplished in accordance with the present invention with essentially no loss of desirable thermal stability or mechanical properties of shaped articles, and depending on the particular end use, some improvement in physical properties can be achieved.

The copolymer composition according to the present invention can be achieved by two different routes:

(a) One method involves the reaction of an appropriate dianhydride with a mixture of diamines and aromatic tetraamines, the relative proportions of the two types of amines being dictated byt he relative proportions of imide and imidazopyrrolone groups desired in the final copolymer:

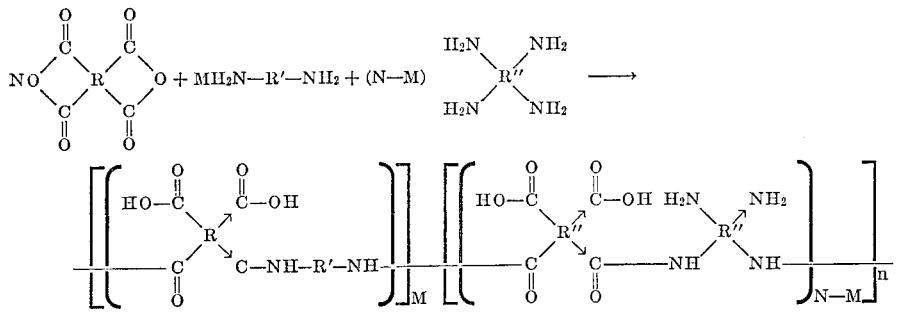

(I)

where $n$ is an integer equal to or greater than 1, N averages at least 5, M averages in the range of .5 to 4.5 and the arrows denote isomerism. It should be understood that these copolymers may be completely ordered or random, alternating or block in structure. These variations can be achieved by choice of suitable reagents or by the method of combination of the starting materials. The details of R, R', and R" will be described hereinafter.

Heating of the carboxy- and amino-substituted polyamide structure (I) at temperatures above 75° C. leads to the desired copoly(imidazopyrrolone/imide) form (II):

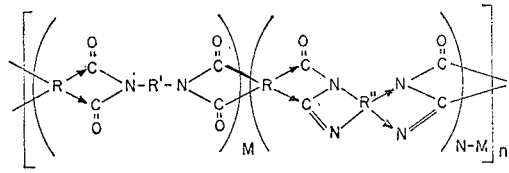

(II)

(b) A second method of preparing the copolymers involves the reaction of a dianhydride with a triamine, either alone or in conjunction with di- and/or tetraamines. For example, a copolymer containing a 1:1 ratio of imide:imidazopyrrolone groups can be prepared by the reaction of a dianhydride with the triamine:

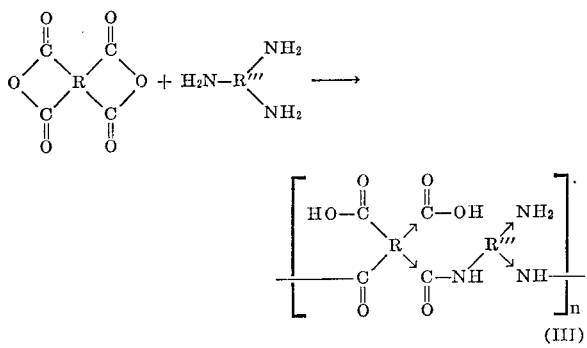

(III)

Heating of the carboxy- and amino-substituted polyamide structure III results in the formation of the copoly(imidazopyrrolone/imide (IV):

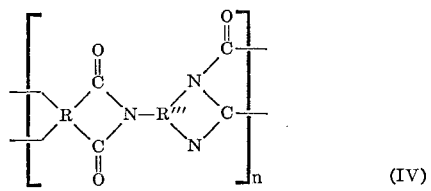

(IV)

Ratios of imide:imidazopyrrolone groups in the polymer chain greater than 1:1 could be achieved by inclusion of the calculated amounts of diamines in the initial polymerization reaction, while ratios less than 1:1 could be achieved by inclusion of tetraamines in the initial polymerization.

Although the usual forms for the reactants are the dianhydrides and the di-, tri- and tetraamines, it should be understood that derivatives of the basic structures can be used. For example, the amines may be utilized in the forms of their mono or polyhydrochloride salts. Likewise derivatives of the anhydrides, such as the acids, amides, esters, and acid chlorides as well as combinations of those groups on the anhydride nucleus can be employed. It is necessary to only modify the polymerization conditions to accommodate the derivatives.

The preferred process for preparation of the copoly(imidazopyrrolone/imide) involves the addition of the dianhydride to a solution of the triamine, or mixtures of di-, tri- and/or tetraamines, the solvents being chosen from one or more of the highly polar types such as N,N-dimethylformamide (DMF), N,N - dimethylacetamide (DMAc), N-methylpyrrolidone (NMP), dimethyl sulfoxide (DMSO), N-methylcaprolactam, tetramethyl urea, tetramethylene sulfone, etc. The addition of the dianhydride is stopped when the desired viscosity level of the polyamide solution has been reached. This viscous polymer solution can then be utilized for fabrication of shaped articles, such as films, coatings, laminates, fibers, adhesives, or the polyamide can be obtained as a powder suitable for compression molding by addition of the solution of the polyamide to a nonsolvent. Heating of the shaped article to temperatures in excess of 75° C. leads to the polymer structure with maximum mechanical properties, thermal stability, and chemical resistance.

The R groups in the dianhydrides of reactions I, II, III, and IV are tetravalent organic radicals chosen from aromatic, aliphatic, cycloaliphatic, heterocyclic, and combinations of those classes, as well as substituted radicals of the above classes. The preferred dianhydrides are pyromellitic dianhydride, 3,3',4,4'-benzophenone tetracarboxylic acid dianhydride, (1,2,5,6-, 2,3,6,7- and 1,4,5,8-naphthalene tetracarboxylic acid dianhydride), 1,2,3,4-cyclopentane tetracarboxylic acid dianhydride, (2,2',3,3'- and 3,3',4,4'-diphenyltetracarboxylic acid dianhydrides), bis(3,4-dicarboxyphenyl) sulfone dianhydride, bis(3,4-dicarboxyphenyl) ether dianhydride, 3,4,9,10-perylene tetracarboxylic acid dianhydride and pyrazine-2,3,5,6-tetracarboxylic dianhydride.

The R', R", and R'" groups of the di-, tetra- and triamines may be selected from aromatic, aliphatic, aromaticaliphatic combinations, heterocyclic, cycloaliphatic, and bridge organic groups where the bridge is oxygen, nitrogen, sulfur, alkyl, and carbonyl. Among the di-, tri- and tetraamines which are useful in the present invention are: m- and p-phenylene diamines, 1,2,3-benzene triamine, 1,2,4,5-benzene tetraamine, (3,3'- and 4,4'-di-aminodiphenyl), (3'-amino- and 3,3'-diaminobenzidine), 3,3'- and 4,4'-diamino-, 3,3',4- and 3,4,4'-triamino-, and 3,3',4,4'-tetraaminodiphenyl ether, (3,3'- and 4,4'-diamino-, 3,3',4- and 3,4,4'-triamino-, and 3,3',4,4'-tetraaminodiphenyl methane) (3,3'- and 4,4'-diamino-, 3,3',4- and 3,4,4'-triamino- and 3,3',4,4'-tetraaminodiphenyl sulfide), (3,3'- and 4,4'-diamino-, 3,3',4- and 3,4,4'-triamino-, and 3,3',4,4'-tetraaminodiphenyl sulfone), (3,3'- and 4,4'-diamino-, 3,3',4- and 3,4,4'-triamino, and 3,3',4,4'-tetraaminobenzophenone), hexamethylene diamine, heptamethylene diamine, octamethylene diamine, nonamethylene diamine, and decamethylene diamine.

The copolymers can be characterized by several methods. Although the solution viscosity of the preferred form of the copolymer (that with the heated and cyclized imidazopyrrolone/imide structure) cannot be measured due to the insolubilities in any practical solvents, the intrinsic viscosity of the substituted polyamide-stage can be measured in numerous solvents, which include those employed for the polymerization. Intrinsic viscosity can be calculated by measuring the viscosity of the polymer solution relative to the viscosity of the solvent alone. The intrinsic viscosity is well-known in the polymer art to be a measure of the molecular weight of the polymer.

Fortuitously, the soluble polyamide-stage of the copolymers can also be utilized in the fabrication of shaped articles. Solutions of the intermediate carboxy- and amino-substituted polyamides can be cast to films and spun to fibers, and a subsequent drying and curing step converts them into useful thermally and chemically resistant finished articles. Likewise, the polymer solution can be used to form strong, durable composite laminated structural materials with glass and carbon fabrics. Chemically resistant coatings for wires and metals result when solutions of the polymer are deposited on the substrates and dried and cured. Precipitation of the intermediate carboxy- and amino-substituted polyamide by addition of the solution to a nonsolvent results in a powder which can be compression-molded to shapes, which after a thermal curing step, can be machined with ease to functional parts which are valuable in end uses where a high order of chemical stability is desired.

A more complete appreciation of the invention will be better understood by reference to the following specific examples relating to specific polymers, their chemical and physical property characteristics, and the processes for preparing the polymers. In each of the following examples, where no specific temperature is given, it is to be understood that room temperature conditions prevailed for the experiment, as is conventional in the art.

EXAMPLE I

A polypyromellitimide was prepared to be used as a control polymer for comparison with the imidazopyrrolone/imide copolymers. A solution of 4.00 grams (0.020 mole) of p,p'-oxydianiline (ODA) in 60 milliliters of N,N-dimethylacetamide (DMAc) was stirred while 4.00 grams of sublimed pyromellitic dianhydride (PMDA) was added. Stirring was continued for 15 minutes after which all of the PMDA had dissolved and reacted. A solution of 0.55 gram of PMDA in 14 milliliters of DMAc was added dropwise to the stirred solution. The total amount of PMDA added was 4.55 grams (0.0208 mole).

After the viscous polymer solution had been stirred for one hour, it was cast onto glass plates and the solvent was removed. The films were dried and cured by heating in a forced-draft air oven at 100° C. for two hours, 175° C. for one hour, and 300° C. for one hour. The yellow films were then stripped from the glass plates and used for chemical and mechanical tests. The intrinsic viscosity of the polymer solution was 1.47 (DMAc, 25° C.).

EXAMPLE II

A PMDA-ODA/TADPO (90/10) copolymer was prepared by the addition of a solution of 4.00 grams of PMDA in 30 milliliters of DMAc to a rapidly stirred solution of 3.60 grams (0.018 mole) of ODA and 0.46 gram (0.002 mole) of TADPO in 35 milliliters of DMAc. After the resulting solution had stirred for 15 minutes, a solution of 0.55 gram of PMDA in 10 milliliters of DMAc was added dropwise. The total of 4.55 grams of PMDA represented 0.0208 mole; the resulting viscous polymer solution was found to have an intrinsic viscosity of 1.65. Films were prepared from the solution by the procedure described in Example I. The resulting light-orange films were clear, tough, and flexible.

EXAMPLE III

The PMDA-ODA/TADPO (75/25) copolymer was prepared by essentially the same procedure described in Example II, using 3.00 grams (0.015 mole) of ODA and 1.15 grams (0.005 mole) of TADPO in 35 milliliters of DMAc, and a total of 4.55 grams (0.0208 mole) of PMDA in 40 milliliters of DMAc. The intrinsic viscosity of the resulting viscous polymer solution was 2.55. Films prepared and cured by the same procedure described for Examples I and II were clear, tough, and flexible and were orange in color.

EXAMPLE IV

The PMDA/ODA/TADPO (50/50) copolymer, that is, a polymer containing 50% imide and 50% imidazopyrrolone groups in the main chain of the polymer was prepared as described for the previous examples. The addition of a total of 4.50 grams (0.0206 mole) of PMDA in 40 milliliters of DMAc to a solution of 2.00 grams (0.010 mole) of ODA and 2.30 grams (0.010 mole) of TADPO in 35 milliliters of MDAc gave a viscous polymer solution with an intrinsic viscosity of 2.78 (DMAc, 25° C.). The red-orange films which were prepared using the identical conditions of Examples I–III were strong, clear, and flexible.

EXAMPLE V

A copolymer, PMDA-ODA/TADPO (25/75), was prepared by the addition of a total of 4.60 grams (0.0211 mole) of PMDA in 40 milliliters of DMAc to a stirred solution of 1.00 grams (0.005 mole) of ODA and 3.45 grams (0.015 mole) of TADPO in 35 milliliters of DMAc. The polymer solution had an intrinsic viscosity of 1.08. The tough, flexible films were red in color after the heat treatment used for the previous examples.

EXAMPLE VI

A copolymer was prepared by the second general procedure (b) described hereinbefore, utilizing a triamine, rather than a mixture of di- and tetraamines as in previous examples. Since the triamine was utilized as the dihydrochloride salt rather than the free base, the polymerization was modified to accommodate the acidic monomer.

A slurry of 4.90 grams (0.025 mole) of 1,2,4-triaminobenzene dihydrochloride (TRAB·HCl) in 100 milliliters of DMAc was stirred with a magnetic stirring bar in a 250–milliliter Erlenmeyer flask equipped with a thermometer and an inlet and outlet for a flow of nitrogen. After 4.40 grams (0.056 mole) of pyridine was added to the slurry to serve as acid acceptor for the hydrogen chloride liberated during the polymerization, the slurry was heated to 35° C. and maintained at that temperature. A solution of 5.50 grams (0.0252 mole) of PMDA in 75 milliliters of DMAc was added to the stirred slurry in a dropwise manner at a rate not exceeding two milliliters per minute. After four hours, approximately 80% of the PMDA solution had been introduced and the red slurry was stirred for 72 hours at 35° C.

At the end of that time, the solution was almost completely homogeneous. The slight amount of insoluble matter was removed by centrifugation and decantation of the clear solution into the polymerization vessel. The remainder of the PMDA solution was added over three hours and this resulted in a high viscous, red polymer solution. The intrinsic viscosity was found to be 0.55. Clear, tough, orange films, which were moderately flexible, were obtained by casting the polymer solution onto glass plates, followed by a drying and curing step at 125° C. for two hours, 200° C. for one hour, and 315° C. for one hour.

The summary of the polymerizations is set forth in Table I.

TABLE I

| Examples | Reactants [a] (m moles) | | | Solvent (ml.) | $\eta$ int.[b] |
|---|---|---|---|---|---|
| | Diamine | Tetraamines | Dianhydride | | |
| I | 20.0 ODA | | 20.8 PMDA | 74 DMAc | 1.47 |
| II | 18.0 ODA | 2.0 TADPO | 20.8 PMDA | 75 DMAc | 1.65 |
| III | 15.0 ODA | 5.0 TADPO | 20.8 PMDA | 75 DMAc | 2.55 |
| IV | 10.0 ODA | 10.0 TADPO | 20.6 PMDA | 75 DMAc | 2.78 |
| V | 5.0 ODA | 15.0 TADPO | 21.1 PMDA | 75 DMAc | 1.08 |
| VI | (25.0 TRAB.HCl+56.0 Py) | | 25.2 PMDA | 175 DMAc | 0.55 |

[a] Abbreviations: ODA=p.p'=oxydianiline; TADPO=3,3',4,4'-tetraaminodiphenyl ether; TRAB.HCl=1,2,4-tetraaminobenzene dihydrochloride; Py=pyridine; PMDA=pyromellitic dianhydride; DMAc=N,N-dimethylacetamide.
[b] Measured in DMAc at 25° C.

The mechanical properties of the films prepared in Examples I–VI were measured with an Instron tensile tester. The results of the test are summarized in Table II.

TABLE II

| Ex. | Polymer type | Modulus (K p.s.i.) | Elongation (percent) | Tensile strength (K p.s.i.) | Yield strength (K p.s.i.) |
|---|---|---|---|---|---|
| 1 | PMDA-ODA | 344 | 7.7 | 11.3 | 4.6 |
| 2 | PMDA-ODA/TADPO (90/10) | 405 | 7.9 | 13.9 | 6.1 |
| 3 | PMDA-ODA/TADPO (75/25) | 502 | 4.7 | 14.7 | 8.6 |
| 4 | PMDA-ODA/TADPO (50/50) | 415 | 4.3 | 14.1 | 8.8 |
| 5 | PMDA-ODA/TADPO (25/75) | 589 | 3.4 | 14.0 | 10.7 |
| 6 | PMDA-TRAB | 809 | 2.0 | 12.8 | |

Specimens of the films prepared in Examples I–VI were immersed in various reagents in order to ascertain the chemical resistance of the polymer films. The results of these tests have been detailed in Table III.

TABLE III.—EFFECTS OF VARIOUS CHEMICALS ON IMIDAZOPYRROLONE/IMIDE COPOLYMER FILMS

| Ex. No. | Type polymer | 2 Normal aqueous sodium hydroxide | 96% Sulfuric acid | Concentrated nitric acid (70%) | Fuming nitric acid (90%) |
|---|---|---|---|---|---|
| 1 | PMDA-ODA | Gelled mass, less than 30 min. | Gelled mass, 16 hours | Film intact, 40 hours | Dissolved in less than 30 min. |
| 2 | PMDA-ODA/TADPO (90/10) | Film intact, 48 hours | Film intact, 48 hours | Film intact, 48 hours | Film intact, 24 hrs.; dissolved 48 hrs. |
| 3 | PMDA-ODA/TADPO (75/25) | do | do | do | Film intact, 48 hours. |
| 4 | PMDA-ODA/TADPO (50/50) | do | do | do | Do. |
| 5 | PMDA-ODA/TADPO (25/75) | do | do | do | Do. |
| 6 | PMDA-TRAB | do | do | Film intact, 24 hrs.; slight degradation at 48 hours. | Film intact, 12 hrs.; some degradation at 48 hours. |

From the results tabulated in Table III it is apparent that the resistance of the imidazopyrrolone/imide copolymers to strong caustic and acidic reagents was outstanding when compared to that of the polyimide (PMDA–ODA) and almost identical to the polyimidazopyrrolones. As little as 10% of the imidazopyrrolone structure resulted in a marked change in the chemical resistance of the copolymers, as shown in the table.

Another experiment which not only emphasized the chemical stability of the imidazopyrrolone/imide copolymers, but also substantiated their copolymeric nature involved soaking 1 mil films of PMDA–ODA/TADPO (75/25 and 25/75) copolymers in yellow fuming nitric acid. After 24 hours the 75/25 and 25/75 copolymers had lost only 5% and 2% of their weights, respectively. In contrast, a film prepared from a simple mixture of 75% PMDA–ODA polyimide and 25% PMDA–TADPO polyimidazopyrrolone lost 57% of its weight after identical treatment.

The thermal stabilities of the polymers were determined by measuring weight losses of the films when heated in air and in vacuum using the thermogravimetric analytical (TGA) technique. The results obtained in vacuum indicated that at temperatures below 600° C. the copolymers with the greater imide content incur power weight losses. However, the TGA curves cross over around 600–625° C. and the thermal stability increases with increasing imidazopyrrolone content at temperatures up to 900° C. Under these conditions it is apparent that the char-forming nature of the polyimides in vacuum improved by copolymerization with the tetraamine.

When heated in air, the plotted decomposition temperatures of the polymer series confirmed the differential thermal analysis curves which had indicated that the temperatures at which the polymers were undergoing maximum rates of decomposition increased with increasing imide content.

It can thus be concluded that the imide group in the copolymer chains enhances oxidative stability of the copolymers in air. Furthermore, it seems likely that this protection might also be extended into thermal exposure in an inert environment at temperatures up to 600° C. since the oxygen contained in the polymer structures might be involved in the degradation. However, it is clear that at temperatures above 600° C. in a vacuum environment, the inclusion of imidazopyrrolone units in the copolymers is responsible for the greater thermal stability of the carbonaceous residue.

The specific novel copolymer examples, their uses, and the methods of preparing these exemplary copolymers as given herein are merely to illustrate applicant's invention and are not to be considered as limitations thereon.

Obviously, there are many variations and modifications of the present invention in the light of the above teachings. It is therefore to be understood that within the scope of the appended claims the invention may be practiced otherwise than as specifically described.

What is claimed as new and desired to be secured by Letters Patent of the United States is:

1. The reaction product of a dianhydried and a mixture of diamine and aromatic tetramines at essentially room temperature and as represented essentially by the following reaction:

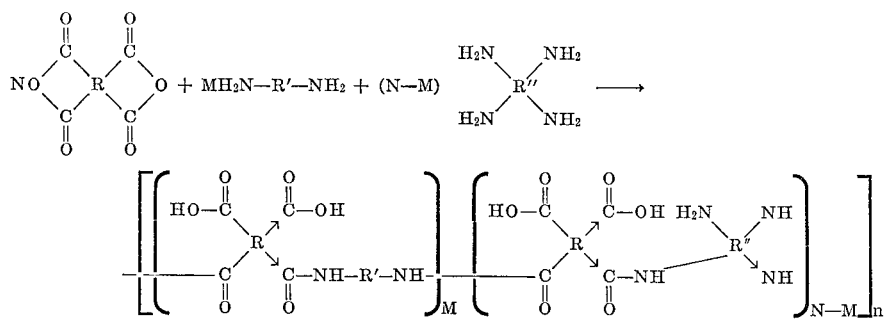

where $n$ is an integer equal to or greater than 1, N averages at least 5, M averages in the range of .5 to 4.5, the arrows denote isomersion, R is selected from the classes of aromatic, aliphatic, cycloalpihatic, and heterocyclic radicals wherein the R' and R'' groups are selected from the aromatic, aliphatic, aromatic-aliphatic combinations, heterocyclic, cycloaliphatic and bridged organic groups and said bridge being selected from the group consisting of oxygen, sulfur, alkylene and carbonyl.

2. The reaction product of claim 1 wherein the amine is selected from the group consisting of m- and p-phenylene diamines, 1,2,4-benzene triamine, 1,2,4,5-benzene tetraamine, (3,3'- and 4,4'-diaminodiphenyl), 3'-amino- and 3,3'-diaminobenzidine), (3,3'- and 4,4'-diamino-, 3,3',4- and 3,4,4'-triamino-, and 3,3',4,4'-tetraaminodiphenyl ether), (3,3'-and 4,4'-diamino-, 3,3',4- and 3,4,4'-triamino-, and 3,3',4,4'-tetraaminodiphenyl methane), (3,3'- and 4,4'-diamino-, 3,3'4 and 3,4,4'-triamino- and 3,3',4,4'-tetraaminodiphenyl sulfide), (3,3'- and 4,4'-diamino-, 3,3'- and 4,4'-diamino-, 3,3,'4 and 3,4,4'-triamino, and 3,3',4,4'-tetraaminobenzophenone), hexamethylene diamine, heptamethylene diamine, octamethylene diamine, nonamethylene diamine, and decamethylene diamine.

3. The reaction product of claim 1 wherein the dianhydride is selected from the group consisting of pyromellitic dianhydride, 3,3',4,4'-benzophenone tetracarboxylic acid dianhydried, (1,2,5,6-,2,3,6,7- and 1,4,5,8-naphthalene tetracarboxylic acid dianhydride), (2,2',3,3'- and 3,3',4,4'-diphenyl tetracarboxylic acid dianhydrides), bis(3,4-dicarboxyphenyl) sulfone dianhydride, bis(3,4-dicarboxyphenyl) ether dianhydride, 3,4,9,10-perylene tetracarboxylic acid dianhydride and pyrazine-2,3,5,6-tetracarboxylic dianhydride.

4. The reaction product of claim 1 wherein when heat cured to a temperature of at least 75° C., yields the copoly(imidazopyrrolone/imide) form:

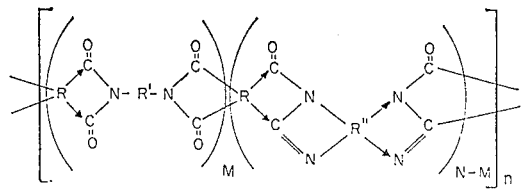

5. A copolymer containing a 1:1 ratio of imide:imidazopyrrolone groups formed by the reaction of a dianhydride and a triamine as shown by:

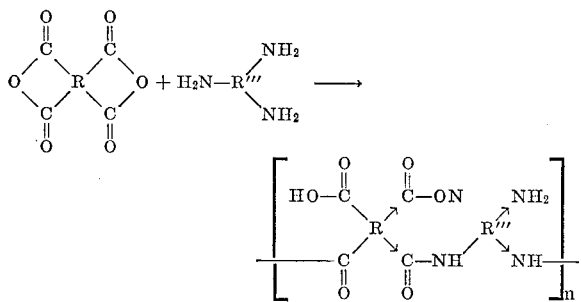

which, when cured by heating to a temperature of at least 75° C. yields;

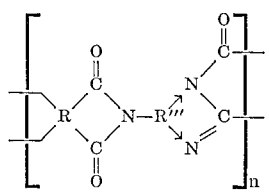

and wherein $n$ is an integer greater than 1, R is selected from the classes of aromatic, aliphatic, cycloaliphatic, and heterocyclic radicals and R''' is selected from the classes of aromatic, aliphatic, aromatic-aliphatic combinations, heterocyclic, cycloaliphatic and bridged organic groups and said bridge being selected from the group consisting of oxygen, sulfur, alkylene and carbonyl.

6. A process for preparing a copoly(imidazopyrrolone/imide) comprising:

adding a quantity of a dianhydride solution to an amine solution wherein the amine solution is selected from the group consisting of triamines, and a mixture of di-, tri-, and tetraamines and wherein the solvent for each of said solutions is a highly polar solvent selected from the group consisting of N,N-dimethylformamide (DMF), N,N - dimethylacetamide (DMAc), N-methylpyrrolidone (NMP), dimethyl sulfoxide (DMSO), N-methylcaprolactam, tetramethyl urea and tetramethylene sulfone, said solution addition being continued until a viscosity of the combined solution in the range of .55–2.75 is obtained and being suitable for end product fabrication of shaped articles, films, coatings, fibers and adhesives.

7. The process of claim 6 wherein the end product is a shaped article and cured at a temperature in excess of 150° C. into final form by subjecting the shaped article to said temperature environment for a sufficient period of time to remove the solvent and thereby produce a cured final structure having improved mechanical properties, thermal stability and chemical resistance.

References Cited

FOREIGN PATENTS 1,429,425  1/1966  France.

OTHER REFERENCES

Colson, J. G., et al.; J. of Polymer Science, 59–70 (1966).

JOSEPH L. SCHOFER, Primary Examiner

C. A. HENDERSON, JR., Assistant Examiner

U.S. Cl. X.R.

117—124, 128.4, 132; 156—331; 260—47, 63, 78.4, 79.3, 79